United States Patent [19]
Schneider

[11] Patent Number: 5,287,695
[45] Date of Patent: Feb. 22, 1994

[54] POWER PLANT SYSTEM

[75] Inventor: Karl-Uwe Schneider, Velbert, Fed. Rep. of Germany

[73] Assignee: RWE Energie Aktiengesellschaft, Essen, Fed. Rep. of Germany

[21] Appl. No.: 979,521

[22] Filed: Nov. 23, 1992

[30] Foreign Application Priority Data

Nov. 23, 1991 [DE] Fed. Rep. of Germany ....... 4138522

[51] Int. Cl.$^5$ ............................................. F02B 43/00
[52] U.S. Cl. ............................ 60/39.12; 60/39.511
[58] Field of Search ............... 60/39.12, 39.181, 39.511

[56] References Cited

U.S. PATENT DOCUMENTS

| | | | |
|---|---|---|---|
| 2,532,035 | 11/1950 | Pfenninger | 60/39.181 |
| 3,020,715 | 2/1962 | Thomsen | 60/39.12 |
| 4,693,072 | 9/1987 | McLean et al. | 60/39.182 |
| 4,974,412 | 12/1990 | Schneider | 60/39.12 X |

FOREIGN PATENT DOCUMENTS 3644192 7/1988 Fed. Rep. of Germany .

Primary Examiner—Richard A. Bertsch
Assistant Examiner—Michael I. Kocharov
Attorney, Agent, or Firm—Herbert Dubno

[57] ABSTRACT

A satellite power plant with a gas turbine, electric current generator and liquid metal circulation heat recovery unit is constructed so that, when a future planned major power plant is erected, the excess fuel gas from its coal gasifier can supply its combustion chamber with the heat recovery unit fuel effective gas turbine unit and the current generator can cover the peak power demand. A device for recovery of low-temperature heat for local heating purposes has its optimum low-temperature thermal energy extraction when the heat recovery unit is shut down.

7 Claims, 1 Drawing Sheet

SATELLITE GENERATING STATION

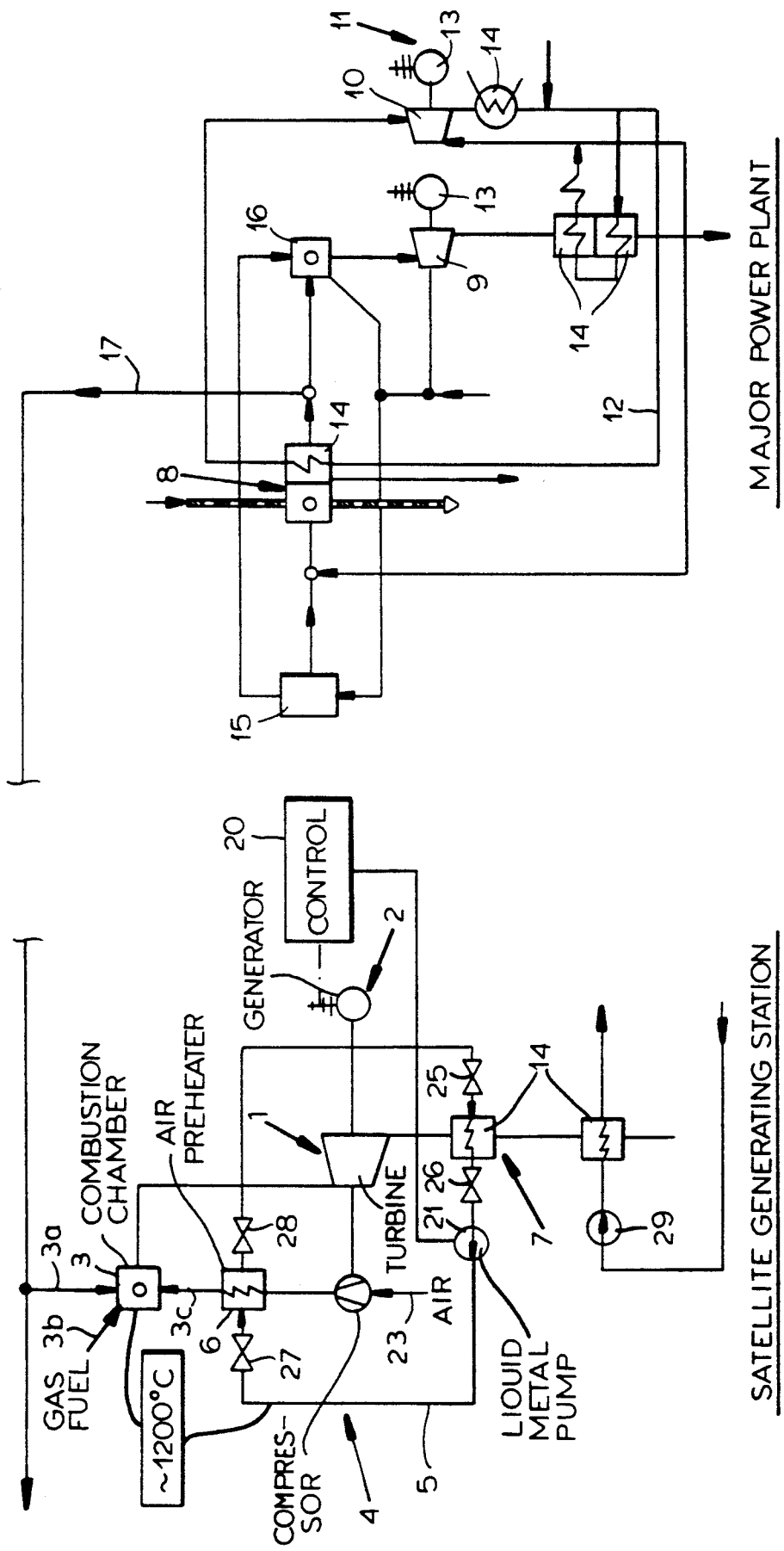

POWER PLANT SYSTEM

FIELD OF THE INVENTION

My present invention relates to a power plant system which has a satellite power plant designed to be used in association with a planned, future-erected major power plant in the form of a combination power plant or integrated power plant having a coal gasifier, a gas turbine unit, a steam turbine unit and electric power generators associated with these turbine units. More particularly, the invention relates to the satellite power plant per se as provided to be used in the future with the major power plant and to systems including both the major power plant after this erection and preconstructed satellite power plant.

BACKGROUND OF THE INVENTION

Integrated power plants which utilize coal and especially lignite or low-value coals as a basis, are known (see German patent 36 44 192), such coal-fired plants being provided as so-called major power plants with outputs in the megawatt range. They can be provided as so-called combination or integrated power plants in which a coal gasifying unit is integrated with a gas turbine main unit, a steam turbine main unit and an electricity-generating main unit driven by one or both of those turbine units.

A major power plant of this type can also be utilized in combination with at least one relatively more remote satellite power plant which may be located closer to the consuming region than the main power plant.

A satellite power plant of this type can comprise a gas turbine unit and an electric current generating unit. The waste heat from the gas turbine main unit of the combination or integrated power plant is supplied to the steam turbine cycle in which a portion of the steam, to utilize its sensible heat, can be supplied to the coal gasifier.

The coal gasifier generally is operated to supply fuel gas quantities which are called for by the demand of the gas turbine main unit of the power plant and an excess can be supplied to the satellite power plant.

In this manner it is possible to achieve a very high utilization of the heat generated by the fuel and, at the same time, obtain a high conversion of the thermal energy of the fuel to electrical energy.

However, there is not always a need at any particular place for a major power plant of the combination type described above, and it is possible that a satellite power plant or a number of satellite power plants which may have outputs of an order of magnitude less than the major power plant, can satisfy the requirements of a particular region.

In those cases, it is uneconomical and undesirable to erect a major power plant at these locations.

It has been a practice heretofore, however, not to provide satellite-type power plants independently of the major power plants, but rather to utilize small independent generating systems, i.e. so-called free-standing power plants in these areas.

However, in regions in which future industrialization or other prognoses of the socioeconomic factors indicate that a major power plant will be required in the future, these completely independent power generating units may ultimately prove to be uneconomical and undesirable as compared with satellite and major power plant systems.

OBJECT OF THE INVENTION

It is, therefore, the principal object of the present invention to provide a compact power plant which can be used initially as an independent or free-standing power plant with high utilization of the fuel heat energy and simultaneously a high electrical output, but which later, as need arises, can be integrated with a major power plant into an integrated system.

Another object of the invention is to provide such a compact power plant, hereinafter referred to as a satellite power plant, even though it may be provided totally independently of a future major power plant, which avoids drawbacks of earlier systems.

Yet another object of the invention is to provide an improved power generating system including a major power plant and at least one satellite power plant.

SUMMARY OF THE INVENTION

These objects and others which will become apparent hereinafter are attained, in accordance with the present invention, by providing a satellite power plant so that it can ultimately be used in association with a planned, later constructed, major power plant in the framework of a stepped planned growth in the power generating requirements, the major power plant being provided in the form of a combination power plant with a coal gasifying unit or coal gasifier, a gas turbine main unit, a steam turbine main unit and a current-generating main unit.

The satellite power plant has a gas turbine unit, a current-generating unit, a combustion chamber for the combustion of fuel gas for the gas turbine unit, and a heat-recovery unit which can be turned on and off, selectively, which has a liquid metal circulation and an air preheater for the combustion air to be supplied to the combustion chamber. A device is also provided for the removal of low-temperature heat for heating purposes (space heating, domestic hot water heating) and the like.

The gas turbine unit with the current-generating unit can be designed, with the heat-recovery unit fully turned on, to be effective to cover the peak current requirements for the region. The device for the removal of low temperature heat is so constructed that it removes the optimum low-temperature thermal energy when the heat recovery unit is shut off.

It will be understood that the satellite power plant can satisfy all partial load requirements as to current demand or the requisite low-temperature heat quantities. It is the teaching of the invention, therefore, that the heat recovery unit be controllable in response to the current drawn or that a controller regulating system automatically responsive to the current drawn be provided to control or regulate this heat recovery system.

The invention is based upon the fact that in planning a power plant system of the aforedescribed type, ultimately to include a major power plant in the form of a combination power plant and at least one satellite power plant or a plurality of such satellite power plants in the power consuming region, initially small or very small power plants can be provided as compact power plants which later can be integrated as satellite power plants in the power plant system.

According to the invention, the compact power plant is operated with high efficiency and very high utilization of the fuel heat and simultaneously output a large amount of electrical energy. Efficiencies above 40 and even over 45% can be achieved, according to the invention when the heat-recovery unit and the combustion chamber are designed for a gas temperature supplied to the gas turbine of about 1200° C. The gas-turbine unit and the current-generator unit and combustion chamber of the satellite power plant are dimensioned for a fuel gas stream which can include the excess volumetric flow of fuel gas from the planned and yet to be erected major power plant to which the satellite power plant can be connected.

More specifically, a satellite power plant capable of independent power generation and adapted to be coupled to the planned future-erected major power plant can comprise:

a gas-turbine satellite unit;

an electric current generating satellite unit operatively connected to the gas-turbine satellite unit and driven thereby to output electrical energy;

a combustion chamber provided with means for burning a fuel gas to produce hot combustion gas, and operatively connected with the gas-turbine satellite unit for driving same with the hot combustion gas;

a heat-recovery unit capable of being switched on and off and having:

a liquid metal circulation for abstracting heat from depleted combustion gas from the gas-turbine satellite unit, an air preheater heated in the liquid metal circulation for heating combustion air and operatively connected with the combustion chamber for supplying preheated combustion air thereto, and means for delivering low-temperature heat for heating purposes, the gas-turbine satellite unit together with the heat-recovery unit being dimensioned to cover peak electric current demand when the heat-recovery unit is switched on, the means for delivering low-temperature heat being dimensioned delivers optimal low-temperature heat when the heat-recovery unit is switched off.

BRIEF DESCRIPTION OF THE DRAWING

The above and other objects, features and advantages of the present invention will become more readily apparent from the following description, reference being made to the accompanying drawing in which:

FIG. 1 is a diagram of a satellite power plant according to the invention; and

FIG. 2 is a diagram of a major power plant to be used with that satellite power plant.

SPECIFIC DESCRIPTION

In the drawing, the units of FIGS. 1 and 2 can be connected by a gas pipe 17 which is shown broken between these Figures, to make it clear that FIG. I represents the satellite power plant according to the invention which is erected first, but which later is used in combination with the main power plant of FIG. 2 when the latter is erected so that the fuel gas supplied to the satellite power plant will be generated at least in part by the gasifier of the main power plant.

From FIG. 1 it can be seen that the satellite power plant of the invention has a gas turbine unit 1 connected to drive an electric power generator 2, the output of which, in terms of current drawn by the load of the unit is used to regulate a liquid metal circulation. The control is here represented at 20.

The turbine is supplied with hot combustion gas from a combustion chamber or combustor 3 in which fuel gas supplied at 3a or 3b is burned with air supplied at 3c.

The line 3a represents the delivery of fuel gas from the gasifier of the major power plant when the same is erected, while the line 3b represents a local fuel supply connected to the satellite generating station at least until the planned major power plant is erected some time in the future.

The apparatus also includes a liquid metal circulation 5 which forms a heat-recovery unit 4 and comprises a liquid metal pump 21 which can be regulated by the control 20 so that this liquid metal circulation can be shut down, turned on or varied as to flow of the liquid metal in response to the current drawn from the generator 2.

A compressor 22 draws ambient air at 23 into the system and is driven by the turbine 1. The air is fed via line 24 to an air preheater 6 before being supplied at 3c to the combustor 3. The liquid metal circulation also includes valves 25, 26, 27 and 28 which also can be shut down, e.g. by the control 20, to prevent convection currents or heat transfer by the heat recovery unit 4 when that heat recovery is not required.

Connected with the heat-recovery unit 4 is a device for withdrawing low temperature heat for heating purposes and the like. The device 7 can comprise an indirect heat exchanger. The low temperature heat can be extracted by pumping at 29 hot water through a heat exchanger 14 traversed by the exhaust gas from the turbine 1. Thus hot water can be used for space heating or atmospheric hot water purposes in the region serviced by the satellite station shown in FIG. 1.

The major power plant shown in FIG. 2 is not yet erected when the satellite power plant is placed in operation. As a result, there is no connection between the plant of FIGS. 1 and 2 initially.

The major power plant of FIG. 2 is fired with coal, especially lignite by gasification. For that purpose, it can include a coal gasifier 8 which has not been described in any detail. The coal gasifier 8 can be in the form of an expanded or circulating fluid bed gasifier. The gas from the coal gasifier 8 is used to fuel the main turbine unit 9 by combustion in the combustor chamber 16 whose hot combustion gas is fed to turbine 9.

A steam turbine main unit 10 can also be provided and the current-generating main unit 11 can comprise two generators 13, each driven by one of the turbines.

The waste heat from the gas turbine main unit 9 is applied through heat exchangers 14 to heat steam or hot water to be converted to steam in the steam turbine circulating 12 which also includes a heat exchanger 14 at the coal gasification unit 8 contributing additional heat to the steam supplied to the turbine 10.

The major power plant also includes a gas cleaning plant which is standard with such power plants and has not been illustrated either.

From the coal gasifier 8, the combustion gas passes via the heat exchanger 14 at this gasifier to the combustion chamber 16. Via a branch line 17, the gas can also be supplied to one or more satellite units such as the one shown in FIG. 1. When the main power plant is erected, therefore, the satellite power plant can be connected thereto via the line 17.

The gas-turbine unit 1, the current-generating unit 2 and the combustion chamber 3 of the satellite power plant are dimensioned for a fuel gas volume rate of flow which is generated as excess combustion gas in the planned and yet to be erected main power plant of FIG. 2.

The heat-recovery unit 4 is switchable on and off. The valves for that purpose have been designated at 25-28 in FIG. 1. The heat-recovery unit comprises the liquid metal circulation 5 together with the air preheater 6 for the combustion air and the device for extracting low temperature heat for heating purposes. The arrangement is so made that the gas turbine unit 1 with the current-generating unit 2, when the heat recovery unit 4 is on or in full operation, can cover the peak electric current demand.

The device 7 is constructed so that, upon full shutdown of the heat-recovery unit, it serves for optimum low temperature heat delivery to the home or water heating system of pump 29. When the liquid metal circulation is effective the heat exchangers 7 deliver waste heat from the gases leaving turbine 1 to the liquid metal circulation and to the low temperature circuit. The heat-recovery unit, moreover, is designed to be controlled by or in response to the current drawn from the generating unit. FIG. 1 of the drawing also shows that the liquid metal circulation 5 and the combustion chamber 3 are designed so that the temperature of the gas supplied to the gas turbine unit 1 is about 1200° C.

I claim:

1. A satellite power plane capable of independent power generation and adapted to be coupled to a planned future-erected major power plant integrating a coal-gasification unit, a gas-turbine main unit, a steam turbine main unit, and an electricity-generating main unit, said satellite power plant comprising:
   a gas-turbine satellite unit;
   an electric current generating satellite unit operatively connected to said gas-turbine satellite unit and driven thereby to output electrical energy;
   a combustion chamber provided with means for burning a fuel gas to produce hot combustion gas, and operatively connected with said gas-turbine satellite unit for driving same with said hot combustion gas;
   a heat-recovery unit capable of being switched on and off and having:
      a liquid metal circulation for abstracting heat from depleted combustion gas from said gas-turbine satellite unit,
      an air preheater heated in said liquid metal circulation for heating combustion air and operatively connected with said combustion chamber for supplying preheated combustion air thereto, and
      means for delivering low-temperature heat for heating purposes, said gas-turbine satellite unit together with said heat-recovery unit being dimensioned to cover peak electric current demand when said heat-recovery unit is switched on, said means for delivering low-temperature heat being dimensioned to deliver optimal low-temperature heat when said heat-recovery unit is switched off; and
   means for controlling said heat-recovery unit in response to electric current drawn from said electric current generating satellite unit.

2. The satellite power plant defined in claim 1 wherein means are provided in said liquid-metal circulation and said combustion chamber for maintaining a temperature of hot combustion gas from said combustion chamber admitted to said gas-turbine satellite unit is about 1200° C.

3. A satellite power plant capable of independent power generation and adapted to be coupled to a planned furture-erected major power plant integrating a coal-gasification unit, a gas-turbine main unit, a steam turbine main unit, and an electricity-generating main unit, said satellite power plant comprising:
   a gas-turbine satellite unit;
   an electric current generating satellite unit operatively connected to said gas-turbine satellite unit and driven thereby to output electrical energy;
   a combustion chamber provided with means for burning a fuel gas to produce hot combustion gas, and operatively connected with said gas-turbine satellite unit for driving same with said hot combustion gas;
   a heat-recovery unit capable of being switched on and off and having;
   a liquid metal circulation for abstracting heat from depleted combustion gas from said gas-turbine satellite unit,
      an air preheater heated in said liquid metal circulation for heating combustion air and operatively connected with said combustion chamber for supplying preheated combustion air thereto, and
      means for delivering low-temperature heat for heating purposes, said gas-turbine satellite unit together with said heat-recovery unit being dimensioned to cover peak electric current demand when said heat-recovery unit is switched on, said means for delivering low-temperature heat being dimensioned to deliver optimal low-temperature heat when said heat-recovery unit is switched off; and
   the gas-turbine satellite unit, the electric current generating satellite unit and the combustion chamber being constructed and arranged to accept an excess fuel gas volume produced in said major power plant upon erection thereof; and
   means for controlling said heat-recovery unit in response to electric current drawn from said electric current generating satellite unit.

4. The satellite power plant defined in claim 1 wherein said liquid-metal circulation and said combustion chamber are provided with means for maintaining a temperature of hot combustion gas from said combustion chamber admitted to said gas-turbine satellite unit at about 1200° C.

5. The satellite power plant defined in claim 4, further comprising a pipe connecting said goal gasification unit with said combustion chamber.

6. An electric power generating system, comprising:
   a major power plant including:
   a coal-gasification unit,
   a gas-turbine main unit including a main combustion chamber connected to said coal-gasification unit for receiving a fuel gas therefrom and burning said fuel gas, and a turbine driven by a combustion gas from said main combustion chamber,
   a steam turbine main unit including a heat exchanger operatively connected with said coal-gasification unit for producing steam, and a steam turbine driven by said steam, and
   an electricity-generating main unit including respective generator driven by said turbines;
   a satellite power plant capable of independent power generation and adapted to be coupled to said major power plant upon erection thereof, said satellite power plant comprising:

a gas-turbine satellite unit, an electric current generating satellite unit operatively connected to said gas-turbine satellite unit and driven thereby to output electrical energy;

a combustion chamber provided with means for burning a fuel gas to produce hot combustion gas, and operatively connected with said gas-turbine satellite unit for driving same with said hot combustion gas, a heat-recovery unit capable of being switched on and off and having;

a liquid metal circulation for abstracting heat from depleted combustion gas from said gas-turbine satellite unit, an air preheater heated in said liquid metal circulation for heating combustion air and operatively connected with said combustion chamber for supplying preheated combustion air thereto, and means for delivering low-temperature heat for heating purposes, said gas-turbine satellite unit together with said heat-recovery unit being dimensioned to cover peak electric current demand when said heat-recovery unit is switched on, said means for delivering low-temperature heat being dimensioned to deliver optimal low-temperature heat when said heat-recovery unit is switched off;

a pipe connecting said combustion chamber of said satellite power plant with said coal gasifier to deliver excess fuel gas produced by said coal gasifier to said combustion chamber of said satellite power plant; and means for controlling said heat-recovery unit in response to electric current drawn from said electric current generating satellite unit.

7. The satellite power plant defined in claim 6 wherein said liquid-metal circulation and said combustion chamber are provided with means for maintaining a temperature of hot combustion gas from said combustion chamber admitted to said gas-turbine satellite unit at about 1200° C.

* * * * *